United States Patent
McCormick

(10) Patent No.: US 7,591,481 B2
(45) Date of Patent: Sep. 22, 2009

(54) VEHICLE OCCUPANT PROTECTION SYSTEM

(75) Inventor: David M. McCormick, St. Clair Shores, MI (US)

(73) Assignee: Authomotive Systems Laboratory, Inc., Armada, MI (US)

( * ) Notice: Subject to any disclaimer, the term of this patent is extended or adjusted under 35 U.S.C. 154(b) by 68 days.

(21) Appl. No.: 11/442,432

(22) Filed: May 26, 2006

(65) Prior Publication Data
US 2006/0279075 A1 Dec. 14, 2006

Related U.S. Application Data

(60) Provisional application No. 60/685,531, filed on May 27, 2005.

(51) Int. Cl.
*B60R 21/26* (2006.01)
(52) U.S. Cl. .................................... 280/736
(58) Field of Classification Search ................ 280/735, 280/736, 737, 740, 741, 742, 124.16, 5.514, 280/5.515, 6.157, 5.158
See application file for complete search history.

(56) References Cited

U.S. PATENT DOCUMENTS

| 3,370,886 | A | * | 2/1968 | Dahle ...................... 280/730.1 |
|---|---|---|---|---|
| 3,927,901 | A | * | 12/1975 | Weman ...................... 280/734 |
| 4,272,102 | A | | 6/1981 | Burkdoll ...................... 280/731 |
| 4,896,898 | A | | 1/1990 | Lenzen et al. ................ 280/735 |
| 4,924,774 | A | | 5/1990 | Lenzen ...................... 102/202.7 |
| 5,145,208 | A | * | 9/1992 | Hoagland et al. ........... 280/734 |
| 5,351,618 | A | | 10/1994 | Brent et al. ................ 102/275.8 |
| 5,415,429 | A | * | 5/1995 | Fisher ......................... 280/741 |
| 5,480,618 | A | | 1/1996 | Calsson et al. .............. 422/164 |
| 5,842,718 | A | * | 12/1998 | Byon .......................... 280/741 |
| 6,422,599 | B2 | * | 7/2002 | Oehm ......................... 280/736 |
| 6,502,856 | B1 | | 1/2003 | Shaklik et al. .............. 280/735 |
| 6,543,804 | B2 | | 4/2003 | Fischer .................... 280/730.2 |
| 7,052,037 | B2 | * | 5/2006 | Nakayasu et al. ........ 280/730.2 |

OTHER PUBLICATIONS

Technical Data Sheet, Excel Lead-in Line Bulk Shock Tube/Orica, PCT Written Opinion, PCT/US06/20671, Dated Oct. 1, 2007.

* cited by examiner

*Primary Examiner*—John Q. Nguyen
*Assistant Examiner*—Robert A. Coker
(74) *Attorney, Agent, or Firm*—L.C. Begin & Associates, PLLC

(57) ABSTRACT

A vehicle occupant protection system includes a plurality of inflatable devices, at least one fluid source for supplying a pressurized fluid for the vehicle occupant protection system, and at least one gas-tight manifold coupled to the at least one fluid source for receiving pressurized fluid from the at least one fluid source. The at least one manifold is also coupled to the plurality of inflatable devices such that, upon activation of the vehicle occupant protection system, the plurality of inflatable devices receive from the at least one manifold sufficient pressurized fluid to inflate the plurality of inflatable devices.

10 Claims, 4 Drawing Sheets

VEHICLE OCCUPANT PROTECTION SYSTEM

CROSS REFERENCE TO RELATED APPLICATIONS

This application claims the benefit of provisional application Ser. No. 60/685,531, filed on May 27, 2005.

BACKGROUND OF THE INVENTION

An ongoing challenge in the design of vehicle occupant protection systems is to simplify and compact the structure of the system. In systems utilizing gas generators or inflators to actuate inflatable elements of the system, one way of simplifying the structure is to centralize the source of the inflation gases for the various devices. However, it is also desirable to preserve the ability to actuate various elements of the vehicle occupant protection system individually or in various combinations, as needed for a given collision scenario. Thus, an adequate gas supply for each inflatable element should be ensured, while also enabling selective inflation of the inflatable elements.

SUMMARY OF THE INVENTION

In accordance with the present invention, a vehicle occupant protection system is provided, including a plurality of inflatable devices, at least one fluid source for supplying a pressurized fluid for the vehicle occupant protection system, and at least one gas-tight manifold coupled to the at least one fluid source for receiving pressurized fluid from the at least one fluid source. The at least one manifold is also coupled to the plurality of inflatable devices such that, upon activation of the vehicle occupant protection system, the plurality of inflatable devices receive from the at least one manifold sufficient pressurized fluid to inflate the plurality of inflatable devices.

In another aspect of the invention, a vehicle occupant protection system is provided including an inflatable device, a fluid source for supplying a pressurized fluid for the vehicle occupant protection system, and a gas-tight manifold coupled to the at least one fluid source for receiving pressurized fluid from the at least one fluid source. The at least one manifold is also coupled to the inflatable device for supplying pressurized fluid to inflate the inflatable device upon activation of the vehicle occupant protection system. Upon activation of the vehicle occupant protection system, all of the pressurized fluid entering the inflatable device is received from the manifold.

In yet another aspect of the invention, an inflation system is provided for selectively inflating at least one selected inflatable device of a plurality of inflatable devices. The inflation system includes at least one fluid source for supplying a pressurized fluid for inflating the plurality of inflatable devices, and a gas-tight manifold coupled to the at least one fluid source for receiving pressurized fluid from the at least one fluid source. The manifold is also coupled to the plurality of inflatable devices for supplying fluid to the plurality of inflatable devices. A flow control mechanism is also provided for selectively directing pressurized fluid from the manifold to the at least one inflatable device of the plurality of inflatable devices upon activation of the inflation system.

DETAILED DESCRIPTION

Unless stated otherwise, the various structural constituents described above are formed by methods known in the art. Different metals such as carbon steel, stainless steel, aluminum, various metallic alloys, and polymers are all contemplated as useful when forming these parts.

Figure 1:
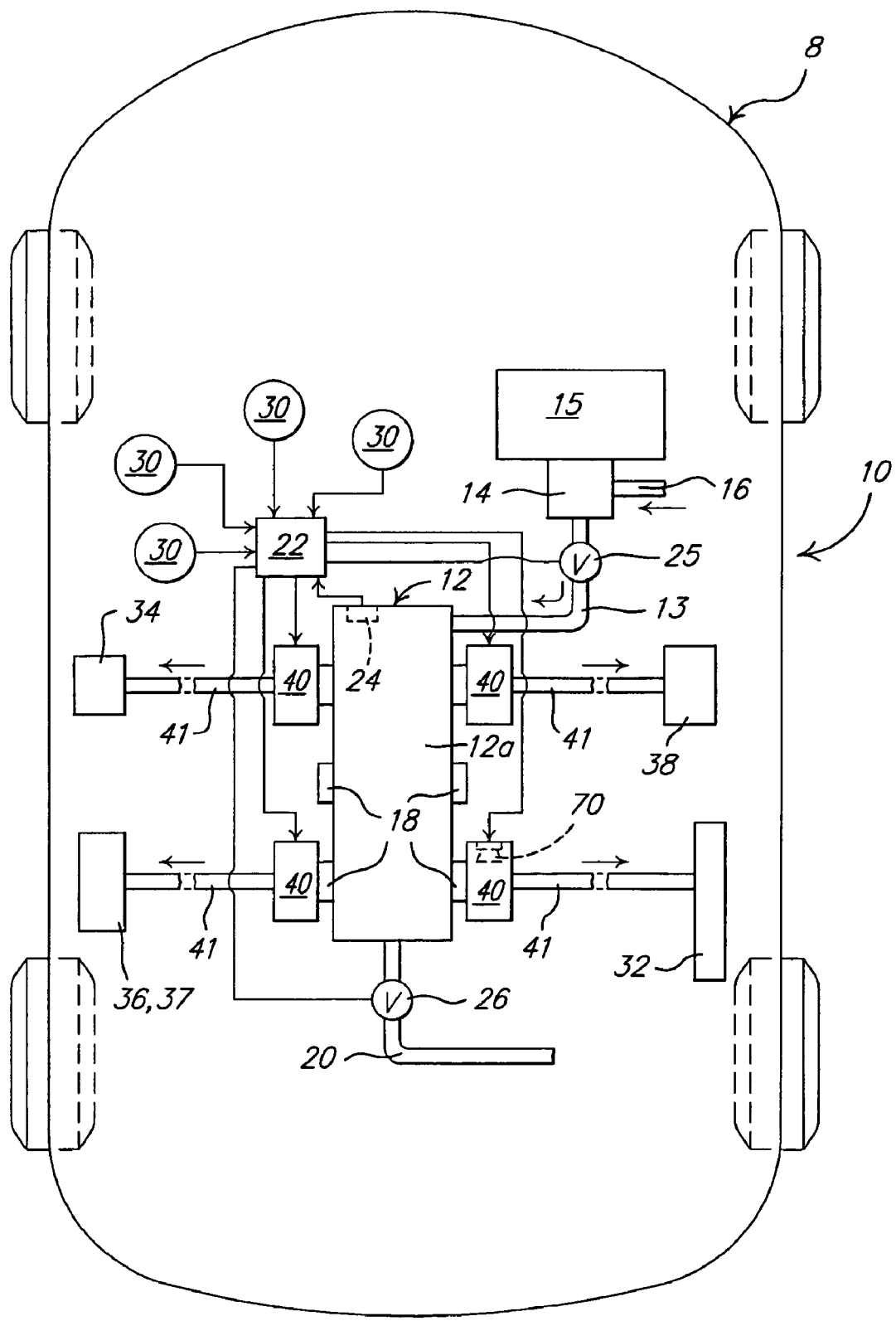
FIG. 1 is a schematic view of one embodiment of a vehicle occupant protection system in accordance with the present invention incorporated into a vehicle.

Referring to FIG. 1, an inflatable vehicle occupant protection system 10 in accordance with one embodiment of the present invention includes at least one manifold 12, and at least one pressurized fluid source 14 (such as a compressor or pump) in fluid communication with manifold 12 and incorporated into a vehicle 8. A plurality of inflatable devices 32, 34, 36, 38 (for example, airbags or seatbelt pretensioners) is coupled to manifold 12. Upon activation of the vehicle occupant protection system, inflation gases flow from manifold 12 to inflate one or more of the inflatable devices. Compressor 14 is driven by, for example, the engine 15 of vehicle 8. Compressor 14 compresses outside air drawn through a compressor inlet 16, and discharges the gas into manifold 12 via manifold inlet 13.

In the embodiment shown in FIG. 1, manifold 12 is generally cylindrical and of gas-tight construction. Manifold 12 includes at least one interior chamber 12a which serves as a reservoir for storing compressed air discharged from compressor 14. Manifold 12 has at least one inlet port for 13 receiving gas therein from compressor 14, and at least one outlet port 18 to enable fluid communication with a respective inflatable device coupled to the manifold, in a manner described in greater detail below. Manifold 12 is made from one or more pieces of a metal or metal alloy and may be a cast, drawn, extruded, or otherwise metal-formed. Separate pieces may be joined by welding, brazing, or other suitable means.

Manifold 12 may be positioned so as to reduce its susceptibility to damage in the event of a vehicle collision. For example, manifold 12 may be positioned in the engine compartment of the vehicle, or the manifold may be enclosed within a portion of the vehicle frame designed to withstand various predetermined collision scenarios.

Referring to FIG. 1, in one particular embodiment, manifold 12 has a series of additional ports 18 spaced therealong to enable fluid communication between an interior of the manifold and various additional elements of the vehicle occupant protection system, via distribution conduits 41. These additional elements may include, for example, additional inflatable elements of the vehicle occupant protection system, or gas generator modules for augmenting the inflation gases provided by manifold 12 upon activation of the vehicle occupant protection system. In this embodiment, manifold 12 is coupled to multiple inflatable elements of the vehicle occupant protection system so as to provide inflation gases to any one of (or all of) the inflatable elements upon activation of the protection system. Thus, manifold 12 preferably has enough gas storage capacity to provide a predetermined desired amount of inflation gas to each of the inflatable devices coupled thereto, under conditions defined for a particular application. Adequate compressed fluid or gas is stored to inflate the devices so as to enable each inflatable device to perform its intended functions. Ports 18 not coupled to another element of the system may be provided with a gastight seal (not shown) capable of resisting the internal gas pressures within manifold 12.

An additional port (not shown) may be provided in the body of manifold 12 for release of gases in cases where the manifold internal pressure exceeds a predetermined range. A pressure-relief valve (not shown) may be installed at this pressure relief port to facilitate release of the compressed gases in the event of an excess-pressure condition. The pressure-relief valve may actuate automatically to release the gases when the internal pressure exceeds the predetermined range. Alternatively, the pressure-relief valve may be activated by any one of several known means, for example, by a signal from a controller responsive to a signal from a pressure sensor (not shown) positioned on the manifold so as to enable measurement of the manifold internal pressure.

Referring again to FIG. 1, a gas supply pipe 13 conveys the compressed gas from compressor 14 to manifold 12. A check valve 25 may be positioned along a gas flow path between compressor 14 and manifold 12 to permit flow of pressurized gas from the compressor to the manifold, while blocking a reverse flow of gas from the manifold to the compressor. Any of a variety of suitable, commercially-available check valves may be used.

Also, a discharge pipe 20 having a cut off valve 26 may be provided for discharging the gas in manifold 12 in cases where the engine of the motor vehicle is stopped, when the gas pressure in manifold 12 exceeds a predetermined pressure range, or when the gas pressure in one or more of inflatable devices 32, 34, 36, 38 exceeds a predetermined pressure range defined for the particular inflatable device. Valve 26 may be actuated by, for example, a signal received from a pressure sensor 24 positioned to measure the gas pressure within manifold 12, or from a controller (such as electronic control unit 22, described herein). Opening of valve 26 enables the gas in manifold to be vented, thereby helping to prevent unnecessary over-stressing of the manifold structure. Opening of valve 26 also enables venting of the gases from each device inflated via the manifold. When the gas pressure in an inflatable device exceeds a predetermined pressure limit defined for that device, valve 26 (and any flow control mechanism controlling flow from the manifold to the device) may be opened to provide a path from the device through manifold 12 to discharge pipe 20, thereby relieving excess pressure in the device. In alternative embodiments, a valve or other pressure relief mechanism for the inflatable device may be provided along a flow path between manifold 12 and the device, or a pressure relief mechanism may be incorporated into the structure of the inflatable device itself Referring again to FIG. 1, inflatable vehicle occupant protection devices 32, 34, 36, 38 coupled to manifold 12 may comprise any of a variety of known or suitable inflatable elements, such as side-curtain airbags 32, driver-side airbags 34, front and rear seatbelt retractors 36, seatbelt pretensioners 37, and/or passenger-side airbags 38.

Many known designs of the vehicle occupant protection system elements set forth above have elements incorporated therein which are actuatable using pressurized gases. For example, typical seat belt retractor mechanisms which may be used in conjunction with the present invention are described in U.S. Pat. Nos. 5,743,480, 5,553,803, 5,667,161, 5,451,008, 4,558,832 and 4,597,546, incorporated herein by reference. Illustrative examples of typical seatbelt pretensioners usable in conjunction with the present invention are described in U.S. Pat. Nos. 6,505,790 and 6,419,177, incorporated herein by reference.

Referring again to FIG. 1, a flow control mechanism, generally designated 40, is provided for selectively directing pressurized fluid from each manifold port 18 to one or more associated inflatable vehicle occupant protection devices upon activation of the inflation system. Many different types of flow control mechanisms are usable in the present invention. For example, in one embodiment, flow control mechanism 40 comprises a seal which is rupturable, frangible, or otherwise breakable positioned at an associated orifice in one port 18 leading from manifold 12 to an associated inflatable device of the vehicle occupant protection system. As used herein, the term "breakable" is understood to mean that the seal may be rendered useless or inoperative. The seal is positioned to block an associated gas exit orifice leading from manifold 12, thereby forming a fluid-tight barrier preventing flow of pressurized gas through or around the seal. The seal is designed to prevent flow of compressed gas from manifold 12 to the associated inflatable element when the gas pressure within manifold 12 is within a specified range (i.e., the pressure range in which the compressed gas is stored in manifold 12 prior to activation of the vehicle occupant protection system.) The seal may, for example, be designed to fracture or displace due to an overpressure condition created by ignition of an associated igniter assembly. Alternatively, the seal may be formed from a destructible or frangible plug positioned to close a gas flow exit orifice and designed to break upon exposure to the heat and/or combustions products resulting from activation of an associated igniter assembly. One example of a flow control mechanism using such a frangible seal is disclosed in co-owned U.S. patent application Ser. Nos. 11/260,824, incorporated herein by reference. Co-owned U.S. patent application Ser. Nos. 10/969,254 and 11/104,042, also incorporated herein by reference, provide additional illustrative, non-limiting examples of flow control mechanisms usable in the present invention. In addition, other flow control mechanisms suitable or adaptable for the purposes described herein are also contemplated.

Each breakable seal may be coupled to an associated igniter assembly 70 (see FIG. 2) such that activation of the igniter assembly produces piercing of the seal, displacement of the seal, or deactivation of the seal by other modes, thereby enabling gas flow from manifold 12 to an associated inflatable element of the vehicle occupant protection system. The igniter assembly may be activated responsive to a signal received from a sensor or controller as described herein. Alternatively, multiple seals may be breached by activating a single igniter assembly configured to create a pressure surge or transient within the manifold interior sufficient to rupture all of the seals. Thus, the seals may be configured to be either collectively breakable, individually breakable, or both, depending on the requirements of a projected collision scenario.

The igniter assemblies(s) may be secured to manifold 12 or to another portion of the vehicle using any one of several known methods, for example, by welding, crimping, using an interference fit, or by adhesive application. The seals may be stamped, formed, molded or otherwise fabricated from any of a variety of gas or fluid impermeable materials, as is known in the art. Exemplary materials include aluminum, steel, tin and nonmetal or polymeric seals. The materials and structure of the seal will depend on the pressure of the fluid sealed in manifold 12 and the desired performance characteristics of the vehicle occupant protection system. For example, seals made from materials and/or having structures which are relatively more or less readily ruptured may be used.

Igniter assemblies 70 generally include an igniter and a quantity of an ignitable material positioned so as to enable ignition thereof upon activation of the igniter. An igniter assembly suitable for the application described herein may be obtained from any of a variety of known sources, for example Primex Technologies, Inc. of Redmond, Wash. or Aerospace Propulsion Products bv, of The Netherlands. Alternatively, an igniter assembly suitable for use in the present invention may be constructed as known in the art from individual components including a housing, an igniter secured to the housing, and an ignitable material positioned in the housing so as to enable ignition thereof upon activation of the igniter. The igniter may be formed as known in the art. One exemplary igniter construction is described in U.S. Pat. No. 6,009,809, herein incorporated by reference.

The embodiments described above provide pressurized gas for inflation of the inflatable devices, wherein the pressurized gas is produced using non-pyrotechnic means. That is, while flow control devices 40 may employ a squib or igniter assembly to break the seal and release the gas in the manifold (thereby producing some exhaust gases incident to squib activation), the primary source of inflation gas is the pressurized gas stored in manifold 14 prior to activation of the vehicle occupant protection system and is, therefore, not generated using a pyrotechnic gas generant.

In certain collision scenarios, it may be necessary to simultaneously activate most or all of the inflatable occupant protection devices installed at various positions on the vehicle. Manifold 12 preferably has enough capacity to store sufficient gas at sufficient pressure to inflate all of the inflatable sub-systems of the vehicle occupant protection system simultaneously. However, the internal pressure and the amount of gas within manifold 12 upon activation of the restraint system may also be adjusted by suitably controlling the amount and/or composition of ignitable material incorporated into one or more of the igniter assemblies used to breach the seals. That is, the internal pressure in manifold 12 may be increased above the normal pressure level provided by compressor 14 prior to or substantially simultaneously with transfer of the gases to the inflatable elements, by controlling the amount and/or composition of ignitable material in the igniter assemblies. Increasing the amount and/or modifying the composition of ignitable material in the igniter assemblies provides additional gas and pressure in instances where most or all of the inflatable occupant protection devices must be inflated simultaneously.

In another embodiment (not shown), one or more of flow control mechanisms 40 comprise a series of valves positioned to control a flow of gases between the manifold and the inflatable elements of the vehicle occupant protection system. The valves controlling flow to the inflatable devices may be collectively actuatable (for example, responsive to a signal from a sensor or a controller) to release all of the gas in manifold into all of the inflatable devices substantially simultaneously. Each flow control mechanism 40 may also or alternatively be individually actuatable to direct pressurized gas from manifold 12 into one or more associated elements of the vehicle occupant protection system.

Any combination of valves, rupturable seals, or other flow control mechanisms may also be employed in a single manifold to control flow from the manifold to individual inflatable elements of the vehicle occupant protection system.

In yet another embodiment, a single breakable seal, valve, or other flow control mechanism may be used to control gas flow from the manifold to all of the associated inflatable devices. In this embodiment, breakage of the seal or actuation of the valve would enable pressurized gas to flow to all of the inflatable devices substantially simultaneously, through a single outflow port 18 in manifold 12.

Also, in an embodiment where the flow control mechanism is a valve, the valve may be used to control the inflation profile of the inflatable device. That is, actuation of the valve may be controlled to correspondingly control the rate of inflation, pressure, etc. of an associated inflatable device. This may be accomplished using, for example, a proportional control valve such as a solenoid valve.

As is known in the art, various known collision sensors and other types of sensors (shown schematically in FIGS. 1 and 2 as elements 30) are distributed through the vehicle structure for detecting an imminent collision, for reacting to an occurring collision, or for detecting the presence of any other conditions necessitating deployment of one or more elements of the vehicle occupant protection system. For example, an impact sensor as exemplified in U.S. Pat. No. 5,725,265, herein incorporated by reference, may be employed in the vehicle occupant protection system of the present invention. In a particular embodiment, the sensors incorporated into the vehicle may include one or more predictive collision sensors configured to identify a collision condition before the actual collision occurs. For example, front, rear, and side impact anticipatory sensors usable in the present invention are known in the art and can use any of a variety of technologies including optical, radar (including noise radar, micropower impulse radar, and ultra wideband radar), acoustical, infrared, or a combination thereof. A system employing such predictive collision sensors may contain a neural network processor to make a discrimination between spurious and actual crash scenarios; however, a simulated neural network, a fuzzy logic or other algorithm operating on a microprocessor can also be used. In an embodiment of the vehicle occupant protection system including anticipatory sensors, electronic control unit 22 (described in greater detail below) is configured to operate with the anticipatory sensors. Such sensors and the capabilities of an electronic controller for interfacing with these sensors are described in co-owned U.S. patent application Ser. No. 11/327,754, incorporated herein by reference.

Referring again to FIG. 1, an electronic control unit 22 ("ECU") is provided for managing actuation of flow control mechanisms 40 responsive from inputs to sensors 30. For example, in an embodiment where the flow control mechanism includes breakable seals operatively coupled to associated igniter assemblies, ECU 22 is coupled to the igniter assemblies to provide actuation signals thereto. Similarly, in an embodiment where the flow control mechanism includes one of more valves, ECU 22 is coupled to the valves so as to control opening and closing of the valves. ECU 22 is also coupled to the various types of sensors 30 distributed through the vehicle for detecting an imminent collision, for reacting to an occurring collision, or for detecting the presence of any other conditions necessitating deployment of one or more elements of the vehicle occupant protection system.

The general configuration of ECU 22 is known in the art. In one embodiment, the ECU of the present invention comprises a programmable digital computing apparatus having a processor, ROM, RAM and I/O apparatus coupled to sensor elements 30 on the vehicle. ECU 22 stores and runs a control program while the vehicle is in use. The sensors 30 supply control-related data to ECU 22. The ECU receives input signals from the vehicle sensors 30 (for example, signals indicative of vehicle rate of acceleration, pressure sensors for sensing the internal pressure in manifold 12, etc.) and delivers output control signals to the actuatable flow control mechanisms 40 of the vehicle occupant protection system responsive to the input signals. ECU 22 also communicates with (or incorporates) one or more crash sensor algorithms that signal activation of one or more elements of the vehicle occupant protection system, based on inputs from the sensors as known in the art. ECU 22, flow control mechanisms 40 and/or any other control elements of the vehicle occupant protection system may be incorporated into a control system module (not shown) for coupling to manifold 12.

Operation of the embodiment shown in FIG. 1 will now be discussed. Referring to FIG. 1, when the vehicle engine is switched on, compressor 14 is powered up. Air from the vehicle exterior is drawn into the compressor and sent via conduit 13 to manifold 12. Compressed air is fed into manifold 12 until an indication is received by ECU 22 from pressure sensor 24 that the manifold is charged (i.e., that the internal pressure of the manifold is within a predetermined pressure range). In response to the pressure sensor signal, operation of the compressor is stopped. If pressure sensor 24 senses that the internal pressure in manifold 12 has fallen below the predetermined range during operation of the vehicle, compressor 14 may be re-engaged to return the manifold pressure to within the desired range.

Upon the occurrence of an imminent or current crash condition, signals from one or more of sensors 30 are sent to ECU 22, which generates one or more control signals responsive to the sensor input signals. The control signals are forwarded to the appropriate actuatable flow control elements 40 controlling gas flow to the inflatable elements selected for activation, thereby opening the valves or disabling the seals controlling flow of the gases out of the manifold, releasing the pressurized gases in manifold 12 and directing the gases into the pertinent inflatable elements of the system.

If desired, ECU 22 may direct compressor 14 to keep operating and manifold 12 to keep channeling the pressurized gas provided by the compressor to the selected inflatable elements until the engine cuts out, or until some other predetermined deactivation condition has been met. This enables a constant supply of inflation gas to be provided to the inflatable elements during most or all of the duration of the system activation event.

Upon the occurrence of a predetermined condition, a signal may be forwarded to open discharge valve 26 and the valves (if any) regulating flow between the manifold and the associated inflatable devices, thereby permitting the compressed gases residing therein to bleed out of the vehicle occupant protection system.

Figure 1A:
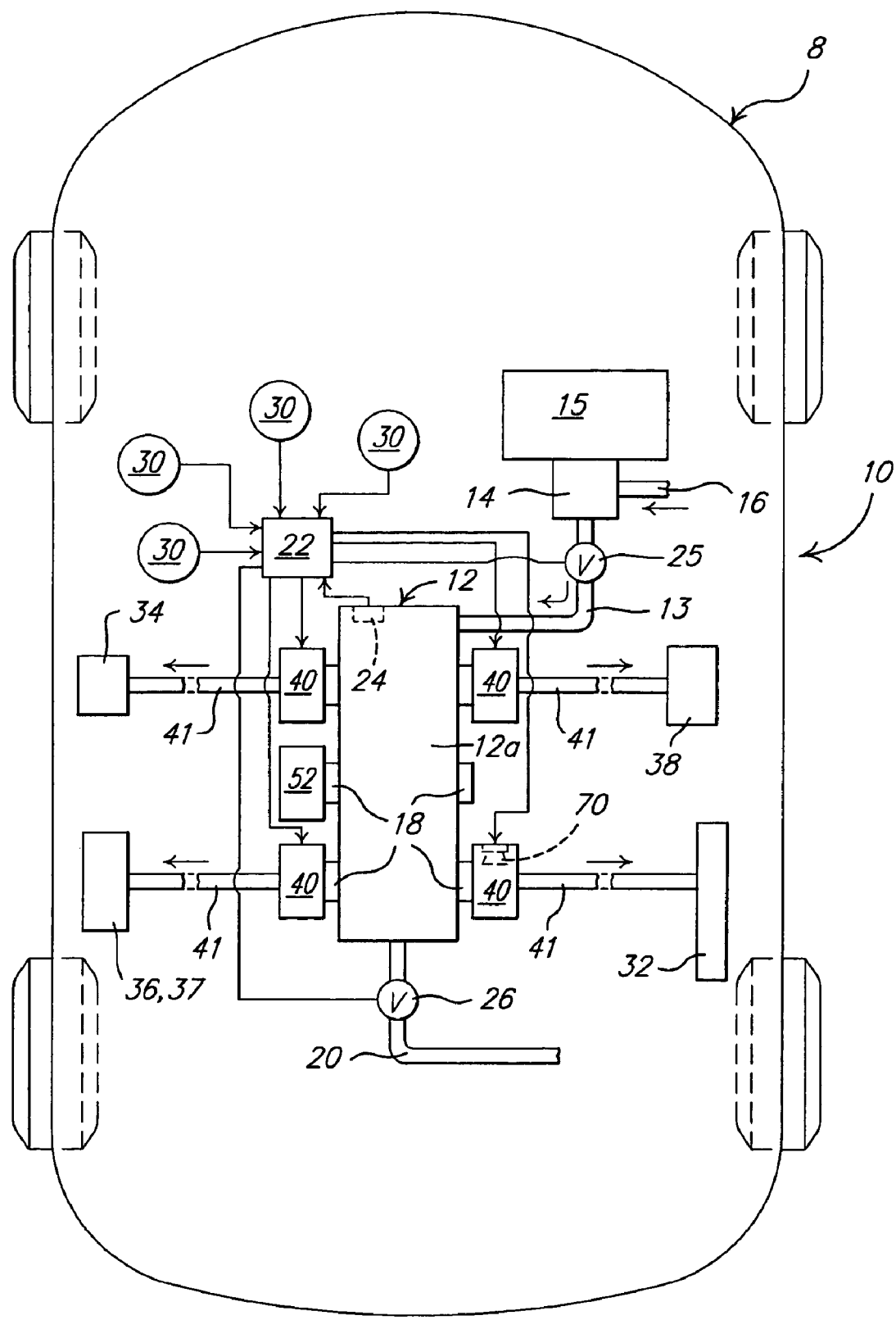
FIG. 1A is a schematic view of the portion of the vehicle occupant protection system shown in FIG. 2, illustrating an alternative embodiment of the present invention.

Referring to FIG. 1A, in another alternative embodiment, one or more conventional inflators or gas generators 52 (for example, pyrotechnic inflators) are coupled to manifold 12 to provide a supplemental supply of inflation gas to the manifold under conditions determined by the requirements of a particular application. Inflator 52 may be docked to the manifold at a connection port 18 (as described herein), or the inflator may be positioned separate from the manifold and coupled to the manifold using a gas-tight tube or pipe so as to enable fluid communication between the inflator and the manifold interior upon activation of the vehicle occupant protection system. The inflator may be activated, for example, by a suitable signal provided by ECU 22 or by a sensor positioned on the vehicle. The inflator may also be activated by a signal provided by another element of the vehicle occupant protection system or by another portion of the vehicle.

In an embodiment incorporating a conventional inflator or gas generator 52 for augmenting the compressed gas in manifold 12, activation signals are conveyed to gas release mechanisms 40 and also to supplementary gas generator 52. Activation of supplementary gas generator 52 may be coordinated with activation of gas release mechanisms 40 such that supplementary gas generator 52 is activated shortly after the opening of gas release mechanisms 40, thereby permitting the gas generated by supplementary gas generator 52 to flow freely through manifold 12 and into the inflatable devices. Routing the gases from the supplementary gas generator 52 through the manifold also permits these gases to be cooled to a degree prior to entry into the inflatable protection devices.

In yet another alternative embodiment (not shown), the compressor or pump is omitted and the primary fluid source for the system comprises one or more conventional inflators coupled to the manifold. Activation of multiple inflators can be timed to provide a flow of pressurized gas over an extended period of time. The gas flow of these inflators is channeled through the manifold, where flow of the gas from the manifold to the inflatable devices is controlled using one or more of the methods previously described. This arrangement, when used with a suitable sensor suite and an ECU coupled thereto as described herein, enables a flow of pressurized gas to be directed simultaneously and/or sequentially to all of the inflatable devices coupled to the manifold, and provides a great degree of flexibility in the number and combination of devices inflated, and in the timing and longevity of inflation of the devices.

Figure 2:
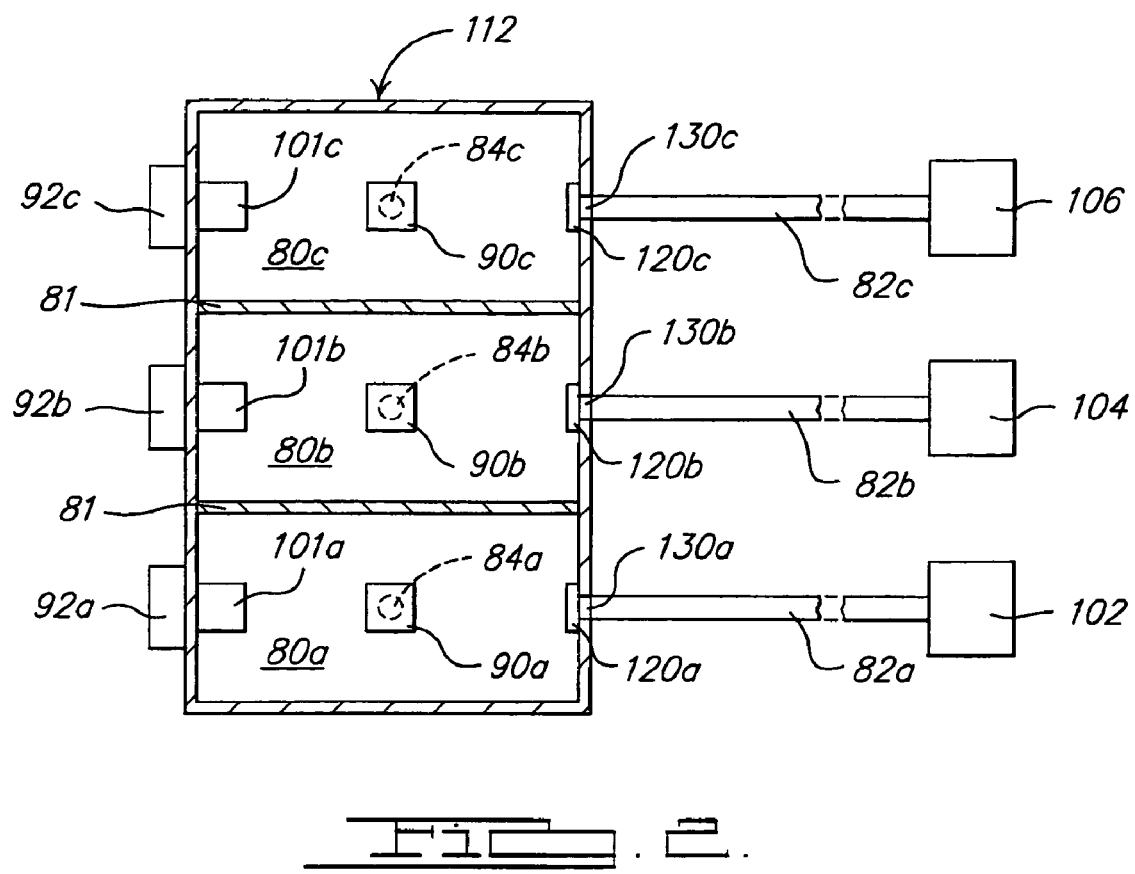
FIG. 2 is a schematic plan view of a portion of another embodiment of a vehicle occupant protection system in accordance with the present invention.
Figure 2A:
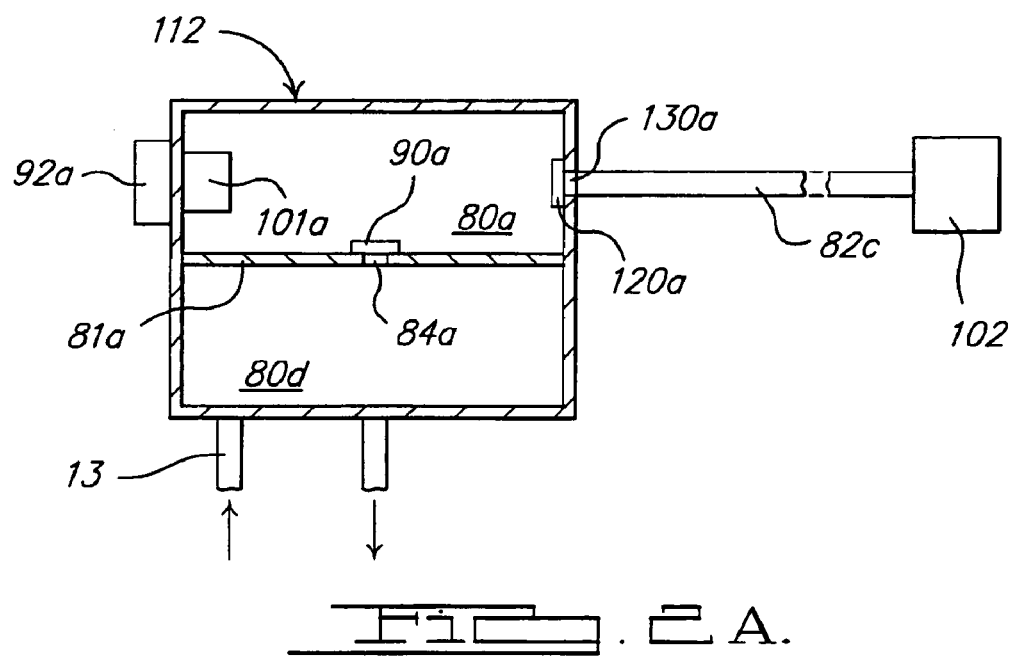
FIG. 2A is a schematic side view of one chamber of the embodiment shown in FIG. 2.

Referring to FIGS. 2 and 2A, in yet another alternative embodiment, a manifold 112 is partitioned into multiple chambers or cavities, with each chamber storing an amount of pressurized fluid at a pressure sufficient to inflate any or all of one or more corresponding inflatable devices coupled to the respective chamber. For example, in the particular embodiment shown in FIGS. 2 and 2A, an interior of manifold 112 is divided into cavities 80a-80d by a plurality of walls 81. Each of cavities 80a-80c is coupled (via a corresponding segment of conduit or tubing 82a-82c) to one or more corresponding inflatable devices 102, 104, 106 of the inflatable vehicle occupant protection system so as to enable fluid communication with the associated devices upon activation of the occupant protection system. Walls 81 prevent direct fluid communication between adjacent cavities 80a, 80b, and 80c. Each of cavities 80a, 80b, and 80c also fluidly communicates, via an associated orifice 84a, 84b, and 84c, with an entrance cavity 80d which receives and stores compressed air from compressor 14 via supply conduit 13. Check valves 90a-90c are provided along a wall 81a separating entrance cavity 80d from each of cavities 80a, 80b, and 80c. Check valves 90a-90c permit flow of pressurized gas from entrance chamber 80d into each of chambers 80a, 80b, and 80c, while blocking the reverse flow of gas from chambers 80a, 80b, and 80c into entrance chamber 80d. A plurality of breakable seals 120a-120c is positioned to cover corresponding gas exit orifices 130a-130c along manifold 112.

Manifold 112 of FIGS. 2 and 2A also includes a series of bays 92a-92c formed in a wall of the manifold as previously described, to enable coupling of an associated plurality of igniter assemblies 101a-101c thereto. Each bay 92a-92c is in fluid communication with an associated chamber 80a, 80b, and 80c of manifold 12. Each igniter assembly may be attached directly to the manifold, or may be coupled to manifold 12 (via tubing or piping) through an associated bay which forms a gas-tight seal with the manifold. Each igniter assembly is also attached coupled to the manifold so as to enable fluid communication with the interior of an associated one of chambers 80a, 80b, and 80c upon activation of the vehicle occupant protection system.

Release of the inflation fluid in manifold cavities 80a-80c may alternatively be controlled by valves or other actuatable flow control elements as previously described, positioned along a flow path between one of manifold cavities 80a-80 and a respective inflatable device coupled thereto. These valve(s) or other flow control elements may be actuated responsive to control signals from sensors or from ECU 22, as previously described.

Operation of the embodiment shown in FIGS. 2 and 2A will be described with the assumption that a breakable seal and an associated igniter assembly is used to control flow of gases from manifold 112. However, it will be understood that valves could be employed in place of some or all of the breakable seals and igniter assemblies. In operation of the embodiment shown in FIGS. 2 and 2A, a compressor (not shown) supplies compressed air or gas through inlet 13 to manifold entrance cavity 80d. Check valves 90a-90c permit the compressed gas to flow from entrance cavity 80d into each of corresponding cavities 80a, 80b, and 80c, thereby enabling the resident gas pressure in cavities 80a, 80b, and 80c to substantially equal the gas pressure in entrance cavity 80d. If it is desired to selectively activate a vehicle occupant protection sub-system (for example an inflatable device 102 associated with chamber 80a), an activation signal is sent from the ECU to an igniter assembly 101a associated with chamber 80a. Actuation of the igniter assembly 101a causes a pressure surge localized within chamber 80a, thereby piercing, displacing, or otherwise deactivating an associated seal 120a and enabling the stored compressed gases and the generated combustion gases to flow out of manifold 12 through an associated gas exit orifice 130a.

The pressure surge also forces check valve 90a to close. As gasses from chamber 80a flow out of gas exit orifice 130a, the gas pressure within chamber 80a is reduced to a point where check valve 90a is opened by pressure of stored compressed gas in entrance chamber 80d, thereby enabling this compressed gas to flow through valve 90a and then through the open manifold gas exit orifice 130a to associated inflatable device 102. As inflatable devices 104 and 106 are not to be activated, the seals 120b and 120c preventing gas flow through gas exit orifices 130b and 130c are not disturbed, and substantially the entire quantity of compressed gas stored in entrance chamber 80d and in cavity 80a is available to aid in the inflation of inflatable device 102. As stored gas flows through check valve 90a, gas pressure within entrance chamber 80d is reduced, thereby forcing check valves 90b and 90c to close. After system activation, igniter assembly 101a and seal 120a blocking flow of gas through orifice 130a can be replaced and manifold 12 re-used.

If desired, depending on the needs of a particular application, each fluid flow path from each of cavities 80a-80c may be provided with a separate fluid flow control device. These fluid flow control devices may be actuatable either separately or together. In addition, different fluid flow paths from the manifold may be provided with different types of fluid flow control devices. For example, fluid flow leading from cavity 80a may be controlled by a burst disk which is pierced by an overpressure condition caused by ignition of an igniter assembly, while fluid flow leading from cavity 80b is controlled by a valve secured to the manifold proximate a fluid exit orifice for cavity 80b.

Referring again to FIG. 1, an actuatable cut off valve 25 may be provided along a gas flow path 13 between the compressor 14 and the manifold 12. Cutoff valve 25 adjusts an amount of gas supplied to manifold 12 in accordance with, for example, a control signal from ECU 22.

Figure 3:
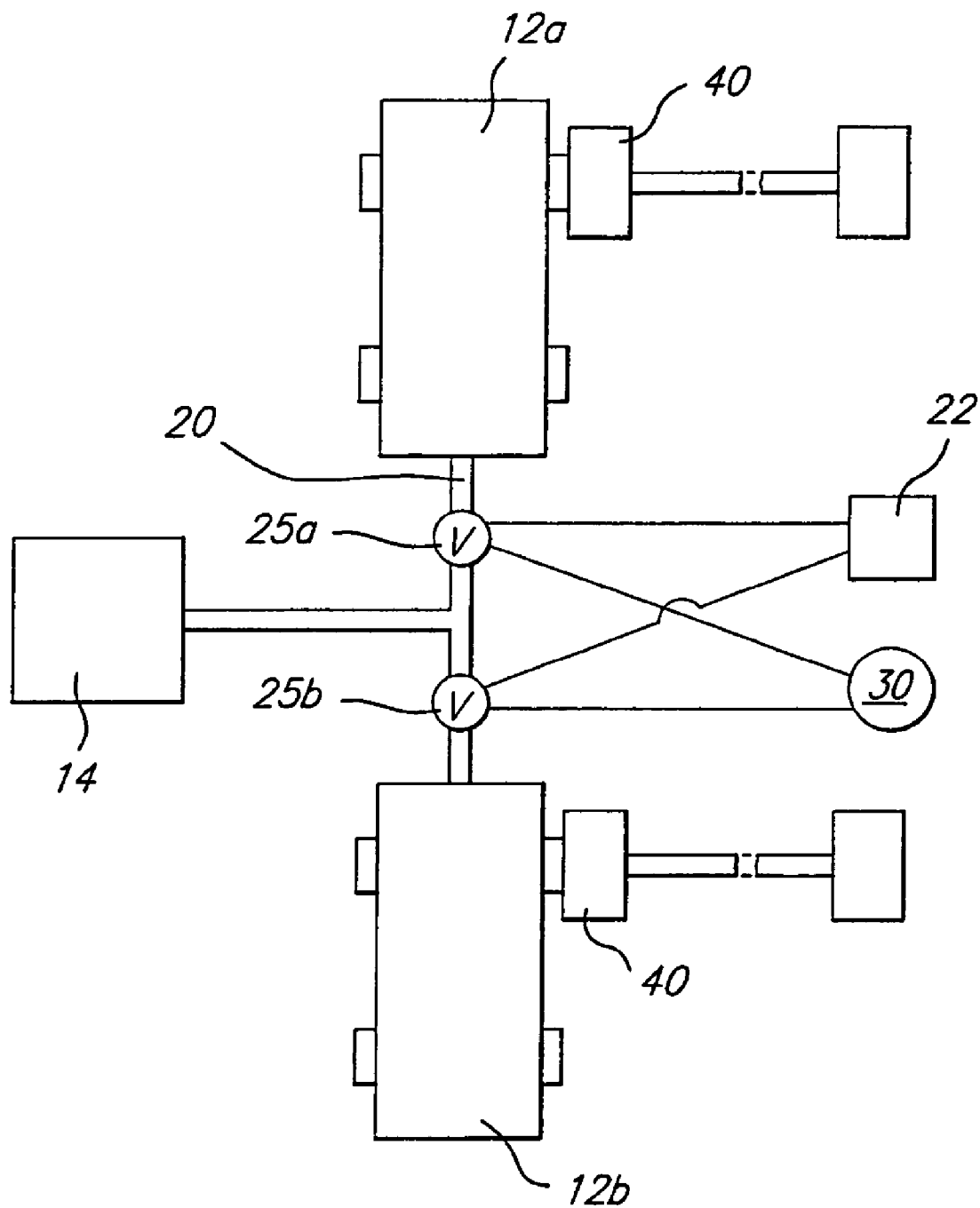
FIG. 3 is a schematic view of a portion of yet another embodiment of a vehicle occupant protection system in accordance with the present invention.

Referring now to FIG. 3, in another embodiment, multiple manifolds 12a-12b are filled with gas using a single compressor 14, and a plurality of cutoff valves 25a-25b is provided, with one cutoff valve positioned along each gas flow path between compressor 14 and a respective one of manifolds 12a-12b. Each cutoff valve 25a-25b controls the flow of gas between compressor 14 and a corresponding one of manifolds 12a-12b. This arrangement enables the flow of gas between the compressor and one of manifolds 12a-12b to be interdicted while the flow between compressor 14 and the other one of manifolds 12a-12b to continue. This is useful in instances where it is desired to provide a controllable flow of gas to selected ones of multiple inflatable devices after the initial inflation of the devices. This arrangement also enables control of the flow of gas between each individual manifold and one or more inflatable devices connected to the manifold, thereby enabling one or more of the inflatable devices to be activated while other inflatable devices remain inactive. Cutoff valves 25a-25b may be actuated, for example, by a control signal received from a sensor 30 or from ECU 22.

Again, if desired, depending on the needs of a particular application, each fluid flow path from each of manifolds 12a-12b may be provided with a separate fluid flow control device. These fluid flow control devices may be actuatable either separately or together. In addition, different fluid flow paths from the manifold may be provided with different types of fluid flow control devices. For example, fluid flow leading from manifold 12a may be controlled by a burst disk which is pierced by an overpressure condition caused by ignition of an igniter, while fluid flow leading from manifold 12b is controlled by a valve secured to the manifold proximate a fluid exit orifice for cavity 12b.

In other alternative embodiments (not shown), the gas release mechanisms may be incorporated into (or positioned proximate) the associated inflatable device of the vehicle occupant protection system, rather than located centrally on or about the manifold.

As described above, the vehicle occupant protection system of the present invention utilizes relatively clean exterior air as the primary inflation gas. Thus, the use of pyrotechnic material and gas generating material for inflating the inflatable elements of the vehicle occupant protection system can be either eliminated or significantly reduced.

Also, elements of the vehicle occupant protection system described herein may be incorporated into one or more modules designed for ease of assembly and replacement.

Furthermore, it may be seen in all of the embodiments set forth herein, that all of the gases used to inflate the inflatable devices are channeled through the manifold. The fact that all of the gases are channeled through the manifold and the arrangement of actuatable flow control devices described herein, when used with a suitable sensor suite and an ECU coupled thereto, enables a flow of pressurized gas to be directed selectively and simultaneously and/or sequentially to each of the inflatable devices coupled to the manifold, and provides a great degree of flexibility in the number and combination of devices inflated, and in the timing and longevity of inflation of the devices, and the amount of pressurized gas made available for inflation of the devices.

In addition, in embodiments of the present invention which use conventional gas generators to augment gas flow, the number of gas generators used, and the number of different types of gas generators, may be reduced. Furthermore, mixing of gas generant combustion products with the exterior air aids in cooling the combustion products prior to expulsion into the inflatable device. Also, different gas generator designs may be docked to a port of the manifold as described herein, by the use of an adapter designed to mate the particular gas generator design with the manifold port configuration. Thus, many different existing gas generator designs may be used in conjunction with the present invention.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A vehicle occupant protection system comprising:
an inflatable device;
a fluid source for supplying a pressurized fluid for the vehicle occupant protection system; and
a gas-tight manifold coupled to the at least one fluid source for receiving pressurized fluid from the at least one fluid source, the at least one manifold also being coupled to the inflatable device for supplying pressurized fluid to inflate the inflatable device upon activation of the vehicle occupant protection system, wherein, upon activation of the vehicle occupant protection system, all of the pressurized fluid entering the inflatable device is received from the manifold,
wherein the fluid source is adapted to supply pressurized fluid to the manifold when a pressure of fluid contained within the manifold falls below a predetermined pressure range.

2. The vehicle occupant protection system of claim 1 wherein the inflatable device is an airbag.

3. A vehicle occupant protection system comprising:
an inflatable device; a fluid source for supplying a pressurized fluid for the vehicle occupant protection system; and
a gas-tight manifold coupled to the at least one fluid source for receiving pressurized fluid from the at least one fluid source, the at least one manifold also being coupled to the inflatable device for supplying pressurized fluid to inflate the inflatable device upon activation of the vehicle occupant protection system, wherein, upon activation of the vehicle occupant protection system, all of the pressurized fluid entering the inflatable device is received from the manifold, wherein the vehicle occupant protection system is installed in a vehicle, wherein the fluid source is powered by an engine of the vehicle, and
wherein, upon activation of the engine, the fluid source supplies pressurized fluid to the manifold until a pressure of fluid contained within the manifold falls within a predetermined pressure range.

4. The vehicle occupant protection system of claim 3 wherein the fluid source is adapted to supply pressurized fluid to the vehicle occupant protection system until the engine is deactivated.

5. An inflation system for selectively inflating at least one inflatable device of a plurality of inflatable devices residing in a vehicle, the system comprising:
at least one fluid source powered by an engine of the vehicle for supplying a pressurized fluid for inflating the at least one inflatable device of the plurality of inflatable devices;
a gas-tight manifold coupled to the at least one fluid source for receiving pressurized fluid from the at least one fluid source, the manifold also being coupled to the plurality of inflatable devices for supplying pressurized fluid to the plurality of inflatable devices; and
a flow control mechanism for selectively directing pressurized fluid from the manifold to the at least one inflatable device of the plurality of inflatable devices upon activation of the inflation system, wherein, upon activation of the engine, the at least one fluid source supplies pressurized fluid to the manifold until a pressure of fluid contained within the manifold falls within a predetermined pressure range.

6. The inflation system of claim 5 wherein flow of the pressurized fluid is selectively directed to the at least one inflatable device responsive to a control signal from a collision sensing device.

7. The inflation system of claim 5 wherein the flow control mechanism is positioned proximate a pressurized fluid outlet on the manifold, and in fluid communication with the inflatable device.

8. The inflation system of claim 5 wherein the flow control mechanism is positioned proximate the inflatable device.

9. The inflation system of claim 5 wherein the flow control mechanism comprises a valve system adapted to control a rate of flow of the pressurized fluid into the plurality of inflatable devices.

10. A vehicle occupant protection system comprising:
a plurality of inflatable devices:
at least one fluid source for supplying a. pressurized fluid for the vehicle occupant protection system;
at least one gas-tight manifold coupled to the at least one fluid source for storing pressurized fluid received from the at least one fluid source, the at least one manifold also being coupled to the plurality of inflatable devices such that, upon activation of the vehicle occupant protection system, the plurality of inflatable devices receive from the at least one manifold sufficient inflation fluid to inflate the plurality of inflatable devices; and
an inflator coupled to the at least one manifold for providing pressurized fluid to the at least one manifold in addition to any pressurized fluid residing in the at least one manifold,
wherein the at least one fluid source is adapted to supply pressurized fluid to the manifold when a pressure of fluid contained within the manifold falls below a predetermined pressure range.

* * * * *